United States Patent

Kashiwazaki

[11] Patent Number: 5,459,824
[45] Date of Patent: Oct. 17, 1995

[54] NAVIGATION APPARATUS CAPABLE OF CHANGING COLOR SCHEME OF A DISPLAYED PICTURE

[75] Inventor: Takashi Kashiwazaki, Saitama, Japan

[73] Assignee: Pioneer Electronic Corporation, Tokyo, Japan

[21] Appl. No.: 403,134

[22] Filed: Mar. 13, 1995

Related U.S. Application Data

[63] Continuation of Ser. No. 905,874, Jun. 29, 1992, abandoned.

[30] Foreign Application Priority Data

Jul. 17, 1991 [JP] Japan .................................. 3-176888

[51] Int. Cl.⁶ .............................. G06T 5/00; G09G 5/06
[52] U.S. Cl. ........................ 395/131; 345/199; 364/449; 364/443; 340/990
[58] Field of Search ........................... 395/131; 364/449, 364/443, 164; 340/990, 995; 345/199, 153, 150; 434/150, 153

[56] References Cited

U.S. PATENT DOCUMENTS

| | | | |
|---|---|---|---|
| 4,706,199 | 11/1987 | Guerin | 364/449 X |
| 4,807,157 | 2/1989 | Fukushima et al. | 395/131 |
| 4,825,381 | 4/1989 | Bottorf et al. | 364/443 |
| 4,951,212 | 8/1990 | Kurihara et al. | 364/449 |
| 4,965,574 | 10/1990 | Fukushima et al. | 345/150 X |
| 4,996,645 | 2/1991 | Schneyderberg Van Der Zon | 364/449 |
| 5,243,528 | 9/1993 | Lefebvre | 364/449 |

FOREIGN PATENT DOCUMENTS

| | | |
|---|---|---|
| 0218109 | 4/1987 | European Pat. Off. |
| 0447978 | 9/1991 | European Pat. Off. |

Primary Examiner—Raymond J. Bayerl
Attorney, Agent, or Firm—Sughrue, Mion, Zinn, Macpeak & Seas

[57] ABSTRACT

A plurality of preset palette data are stored in a ROM. User palette data are input through an RS232C interface and stored in a nonvolatile RAM. Based on an instruction from a user and other information such as a signal indicating the status of an illumination switch, a MPU selects one of the palette data and sets the selected palette data in a look-up table. Image data representing a map, present position, etc. is converted into color data by the look-up table, and then to an analog video signal for a color CRT. A display can be made using the palette data prepared by the user.

6 Claims, 5 Drawing Sheets

FIG. 3(b)

NONVOLATILE RAM
(USER PALETTE DATA)

| 0 | FOR MAP INF. |
| 1 | FOR SERVICE INF. |
| 2 | FOR MAP INF. |
| 3 | FOR SERVICE INF. |
| 4 | FOR MAP INF. |
| 5 | FOR SERVICE INF. |
| 6 | FOR MAP INF. |
| 7 | FOR SERVICE INF. |

FIG. 3(a)

ROM

| 0 | FOR MAP INF. | } FOR RUNNING | } FOR DAYTIME |
| 1 | FOR SERVICE INF. | | |
| 2 | FOR MAP INF. | } FOR A STOPPED STATE | |
| 3 | FOR SERVICE INF. | | |
| 4 | FOR MAP INF. | } FOR RUNNING | } FOR NIGHT-TIME |
| 5 | FOR SERVICE INF. | | |
| 6 | FOR MAP INF. | } FOR A STOPPED STATE | |
| 7 | FOR SERVICE INF. | | |

NAVIGATION APPARATUS CAPABLE OF CHANGING COLOR SCHEME OF A DISPLAYED PICTURE

This is a continuation of U.S. application No. 07/905,874 filed Jun. 29, 1992, now abandoned.

BACKGROUND OF THE INVENTION

The present invention relates to a navigation apparatus which displays a map and indicates a present position on the map, to support a drive of a moving body such as an automobile.

In conventional navigation apparatuses, a color scheme of a map, characters, etc. (which are displayed using multiple colors) is determined in advance on a picture-by-picture basis, and information representing the color scheme is stored in advance together with map information in a CD-ROM or a ROM of the navigation apparatus when it is manufactured. That is, the color scheme of images to be displayed (e.g., maps) is fixed.

Although the color scheme is previously prepared with sufficient consideration of legibility, actually it is not always satisfactory. This is due to the following reasons. While preparation of the color scheme of information to be displayed (e.g., map information) has a subject of providing a legible picture using a smaller number of colors, there exists almost no scheme which everybody feels to be sufficiently legible. It should be considered that printed documents etc. also provide image information using various schemes. For example, red may be used on one hand to indicate dangerous areas, and on the other hand just to draw attention irrespective of danger. Therefore, a person who is in favor of one scheme may feel a sense of incongruity in another scheme. Further, color preference differs from one person to another. As a result, practically, it is impossible to provide a color scheme which is acceptable to a large number of users.

There is another problem. If characteristics of a display device actually used is different from those of another display device used when a color scheme was prepared for information to be displayed, a color tone will deviate from an expected one, and the original scheme, which was prepared to provide enough legibility, will not be effected properly.

SUMMARY OF THE INVENTION

The present invention has been made in consideration of the above problems, and has an object of providing a navigation apparatus which can adjust a color scheme to one preferred by a user, and which easily change a scheme setting so that it becomes suitable for a display device actually used.

FIG. 1 shows a concept of the invention. As shown, the invention is applied to a navigation apparatus which comprises a display means 1 for displaying a color image, an image data storing means 2 for storing image data to be displayed on the display means 1, and a display control means 3 having a color conversion table storing preset color conversion information, for reading the image data from the image data storing means 2, converting the readout image data into color data using the color conversion table, and generating a signal to be provided to the display means 1, and in which at least a map and a present position are displayed on the display means 1. The navigation apparatus is characterized by a color conversion information storing means 4 for storing a plurality of color conversion information, a color conversion information input means 5 for receiving the color conversion information from an external system and storing the received information in the color conversion information storing means 4, and a color conversion information setting means 6 for setting designated one of the plurality of color conversion information stored in the color conversion information storing means 4 in the color conversion table of the display control means 3.

With the above construction, the designated one of the plurality of color conversion information stored in the color conversion information storing means 4 is set in the color conversion table of the display control means 3 by the color conversion information setting means 6, and the map information etc. stored in the image data storing means 2 is displayed on the display means 1. If it is desired to change a color scheme of the displayed map etc., new color information, which has been prepared according to a predetermined method, is input through the color conversion information input means 5 and stored into the color conversion information storing means 4. Thereafter, the color scheme of the displayed map etc. can be changed by inputting designation of the desired color conversion information to the color conversion information setting means 6 and setting the designated color conversion information stored in the color conversion information storing means 4 in the color conversion table of the display control means 3.

BRIEF DESCRIPTION OF THE DRAWINGS

FIGS. 3(a) and 3(b) illustrate a structure of palette data;

DESCRIPTION OF THE PREFERRED EMBODIMENTS

Embodiments of the present invention are described hereinafter in detail with reference to the accompanying drawings.

Figure 1:
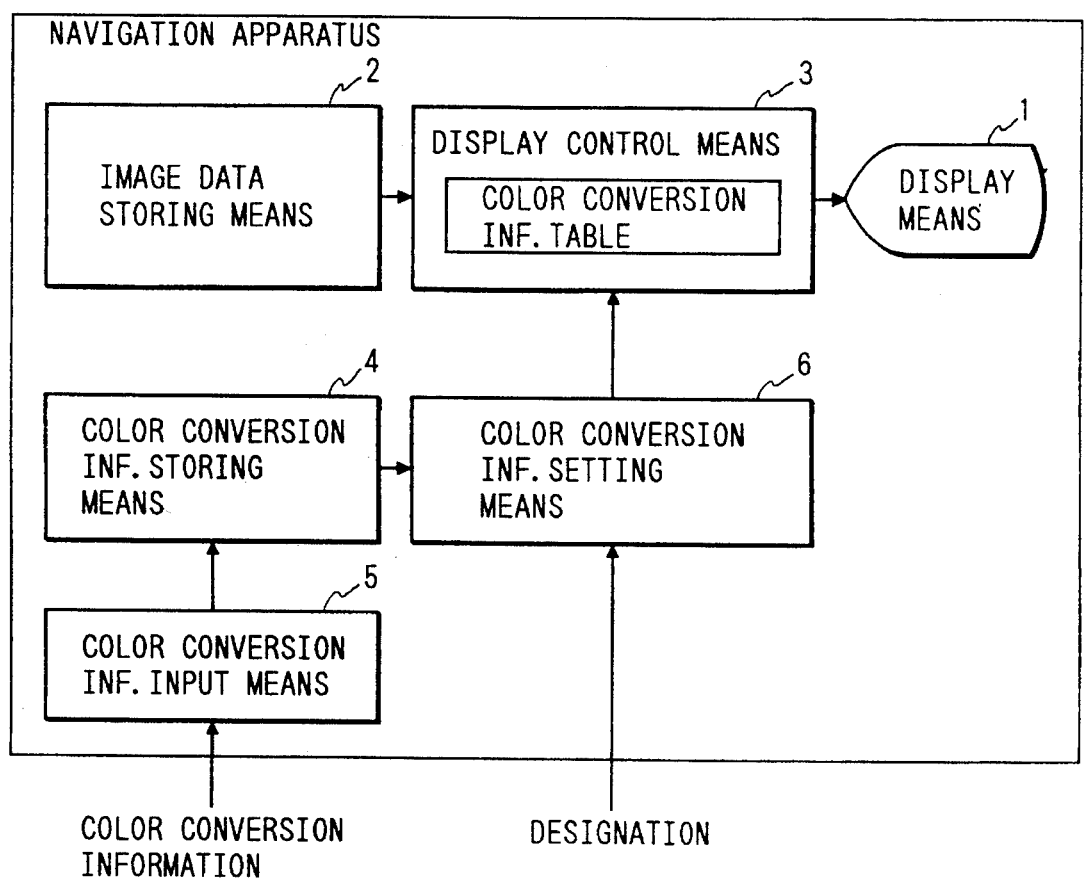
FIG. 1 is a block diagram showing a concept of the present invention.
Figure 2:
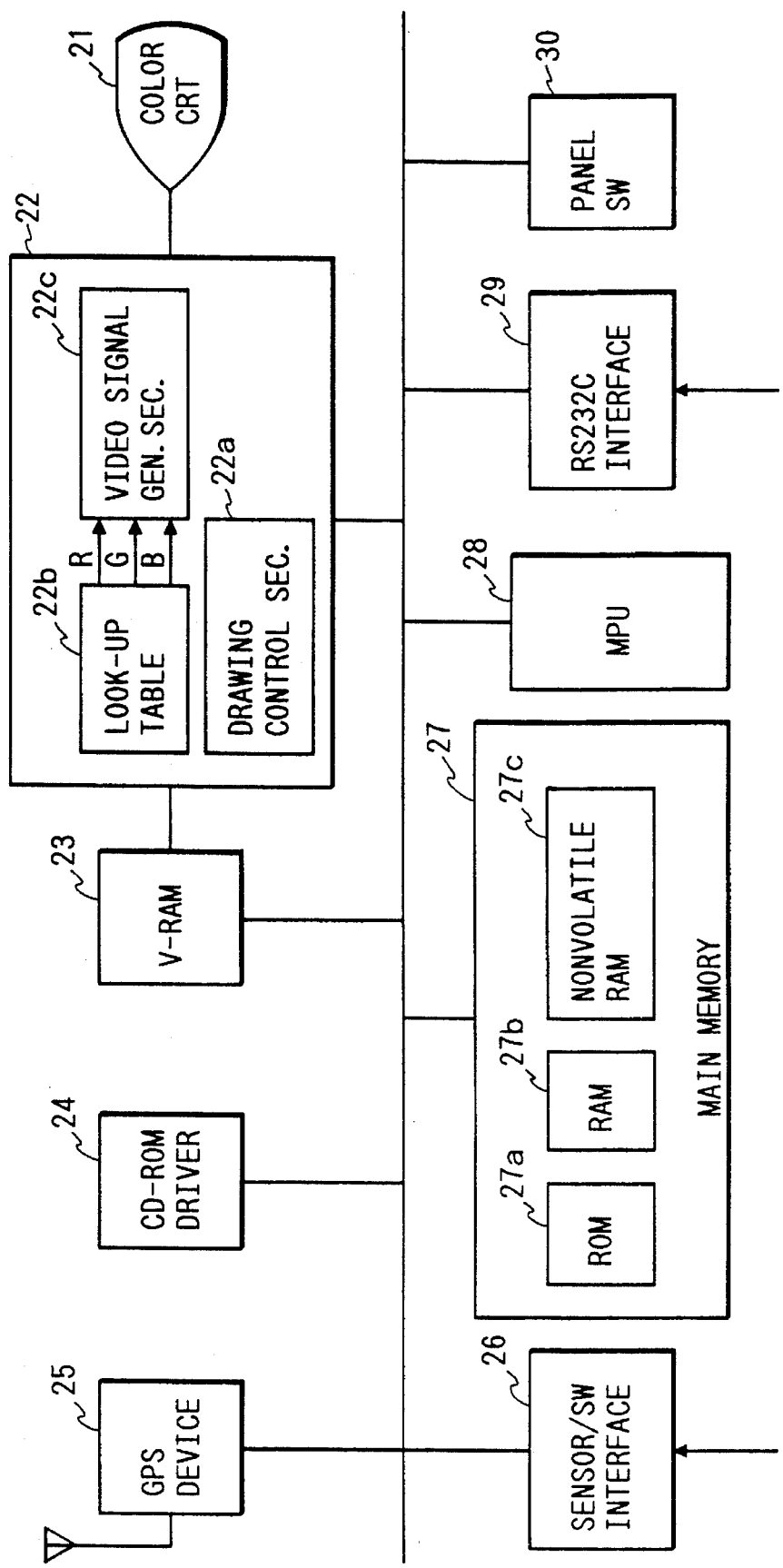
FIG. 2 is a block diagram showing a configuration of a vehicular navigation apparatus according to an embodiment of the invention.

FIG. 2 shows a configuration of a vehicular navigation apparatus according to an embodiment of the invention. A color CRT 21, which corresponds to the display means 1 of FIG. 1, displays color images. A display controller 22 as the display control means 3 has a drawing control section 22a, look-up table 22b and video signal generating section 22c. The drawing control section 22a performs bit-development to a V-RAM 23 (described below) based on image drawing information. The look-up table 22b is a color conversion table to be used for converting data read from the V-RAM 23 into data of the three primary colors. The video signal generating section 22c D/A-converting the color data from the look-up table 22 to produce an analog video signal for the color CRT 21. The V-RAM 23 as the image data storing means 2 is an image memory for storing image data (4 bits per pixel) to be displayed on the color CRT 21. A CD-ROM driver 24 controls data reading from a CD-ROM in which map drawing information, map managing information, service information, etc. are stored. A GPS (global positioning system) device 25, which is a positioning means for determining the own present position, generates positioning data of a longitude and latitude receiving signals from, e.g., three satellites. The positioning means may be so constructed that the GPS device 25 is used together with an independent positioning device which determines the present position by a magnetism sensor and a speed sensor. A sensor/switch interface 26 receives a signal indicating an on/off status of an illumination switch for turning on night illumination and an output signal of a sensor for detecting whether the vehicle is stopped or running. A main memory 27 consists of a ROM 27a, RAM 27b and a battery-backed-up nonvolatile memory 27c. A microprocessor (MPU) 28 control the entire apparatus based on programs stored in the ROM 27a. An RS232C interface 29 is a communication means for serial transmission. Panel switches 30 work as an operation input section.

The navigation apparatus of the invention has a color display capability of displaying pictures by specifying, for one picture, 16 colors from 4,096 colors. The 16 colors are processed in the apparatus by attaching palette numbers 0–15 to the respective colors. Each palette number is given luminance data of the three primary colors (i.e., red, green and blue), in which the luminance data of one primary color has a gradation level selected from 0–15 levels. And the luminance data is processed as palette data, i.e., color-conversion information. In utilizing the palette data, contents of map information are classified into a background, a water system such as rivers and seas, green tracts and various kinds of roads. The color scheme is completed by assigning the palette numbers to these items respectively, and to other image drawing information such as straight lines. In the display controller 22, the drawing control section 22a performs bit-development (4 bits per pixel) to the V-RAM 23 based on the palette numbers designated in the image drawing information. Further, the display controller 22 reads data from the V-RAM 23 bit by bit in synchronism with the video signal, and converts the readout data into the color data in the look-up table 22b. The palette data are preset in the look-up table 22b, which outputs the luminance data of the three primary colors of the palette number that corresponds to the pixel data of 4 bits read from the V-RAM 23. The luminance data of the three primary colors is converted into an analog video signal by the video signal generating section 22c, and displayed by the color CRT 21.

The palette data are stored in the ROM 27a in advance such that they are grouped, in a large sense, into daytime data and night-time data as shown in FIG. 3(a). This is because a displayed color appears differently in daytime and night-time for instance due to reflection of ambient light whose brightness varies in daytime and night-time, and the legibility, which depends on the color scheme, is thereby changed. Whether it is daytime or night-time is judged based on the status of the illumination switch. Further, each of the daytime data and the night-time data is divided into data to be used when the vehicle is running and data to be used when it is stopped. Since during movement a driver cannot afford to look at details of a displayed map, roads and main target places should be colored symbolically so that he can identify his present position at a glance. On the other hand, when the vehicle is stopped, a displayed may should be so colored that its entire area is easy to recognize because the driver watches the entire map area, for instance, to consider a route. Whether the vehicle is running or stopped is judged based on the output of the movement sensor. Still further, each of the data for running and the data for a stopped state is divided into data for map information and data for service information, which are different in display contents. Management numbers are attached to the above eight kinds of palette data to manage those properly.

The nonvolatile RAM 27c of the main memory 27 has a memory area for storing palette data to be prepared by a user. More specifically, the memory area has areas for storing eight palette data as shown in FIG. 3(b). In the same manner as the palette data prepared in the ROM 27a, the palette data in the nonvolatile RAM 27c are given respective management numbers while being grouped into eight types, for daytime and night-time, running and a stopped state, and map information and service information.

With the above construction, upon activation of the apparatus, the MPU 28 performs the development of a menu image data to the V-RAM 23, and displays a menu on the color CRT 21 to prompt the user to make a selection. When the "display of the present position" is selected through the panel switches 30, the MPU 28 reads the palette data for the map information from the ROM 27a, and sets the readout data in the look-up table 22b. Further, the MPU 28 reads the map management information from the CD-ROM, receives the positioning data from the GPS device 25, and selects, based on the map management information, the map which includes the present position indicated by the received positioning data. Then, the MPU 28 reads the image drawing information of the selected map from the CD-ROM, and transfers that data to the drawing control section 22a to display the map. Further, the MPU 28 indicates the present position on the map at the position corresponding to the positioning data. Thereafter, the MPU 28 continues to receive the positioning data from the GPS device 25 at predetermined intervals, and renew the displayed map and present position.

Figure 4B:
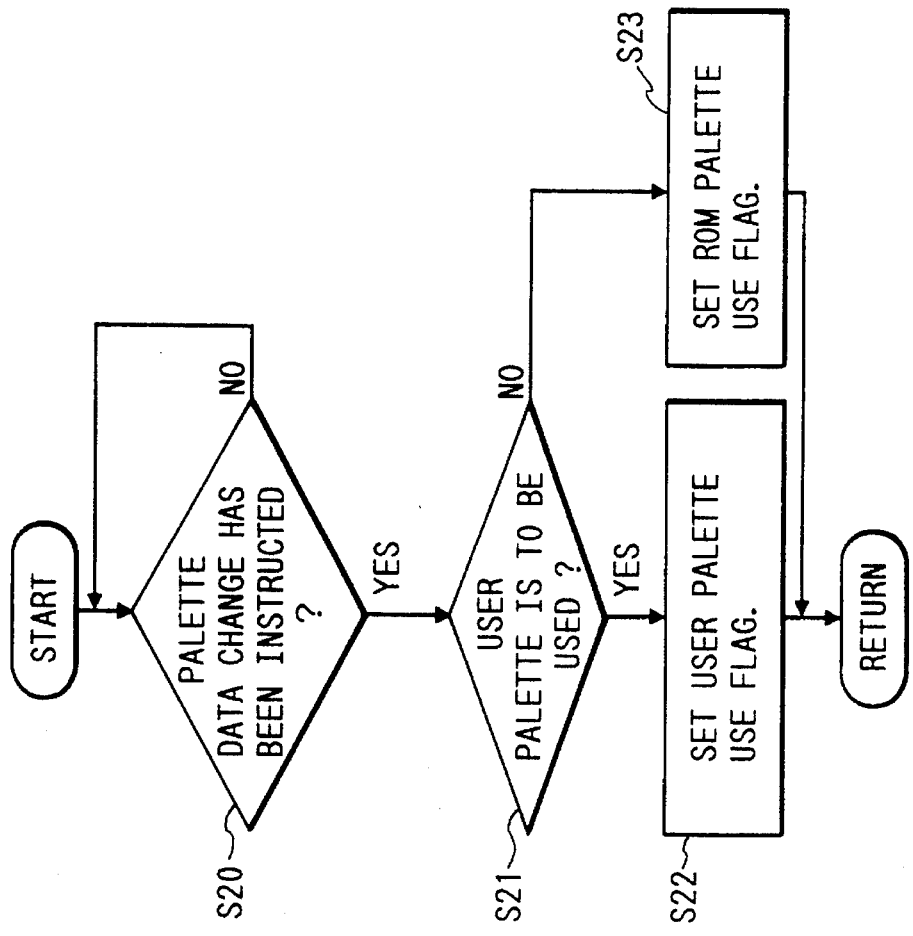
FIG. 4(b) is a flowchart showing a process of specifying the use of user palette data or ROM palette data.
Figure 4A:
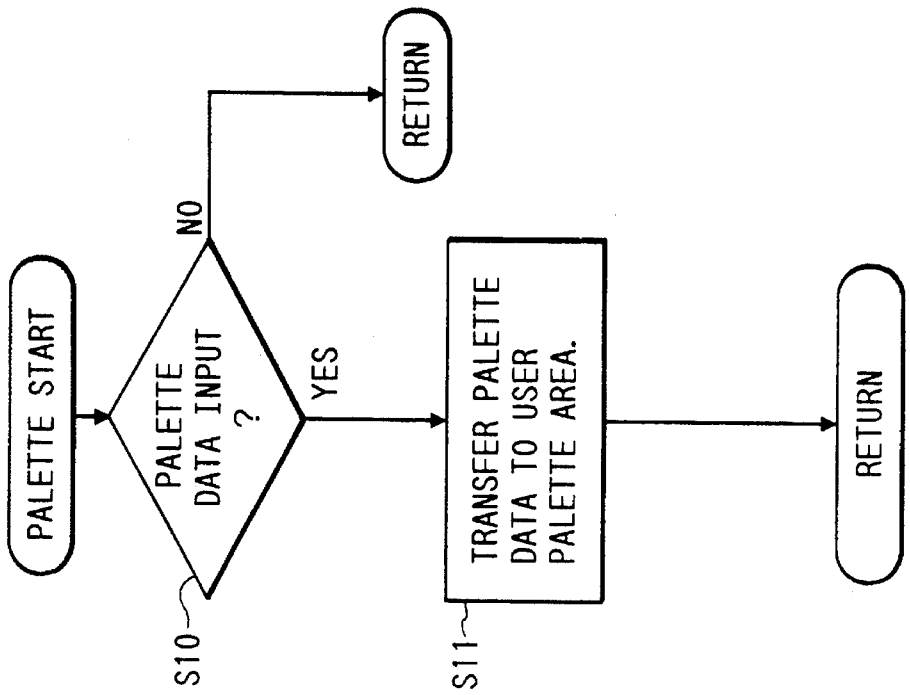
FIG. 4(a) is a flowchart showing a process of receiving user palette data.

Further, the MPU 28 monitors the RS232C interface 29 as the color conversion information input means 5 (see FIG. 1) to control the input of the user palette data. FIG. 4(a) is a schematic flowchart of a routine for this operation. In step S10, the MPU 28 monitors the RS232C interface 29 at the predetermined intervals to judge whether there exists palette data input from the user. If the judgment is affirmative, in step S11 the MPU 28 examines the first-transmitted data indicating the management number, and transfers the subsequently transmitted palette data to the area of the nonvolatile memory which corresponds to the management number.

The change of the palette data is initiated by the user who instructs the display of a menu through the panel switches 30 and then selects the "palette data change" from the menu. The MPU 28, as the color conversion information setting means 6, executes the process of setting the palette data. FIG. 4(b) is a flowchart which is executed when the palette data change is selected. As shown in the flowchart, the MPU 28 first judges in step S20 whether the palette data change has been instructed. If the judgment is affirmative, the MPU 28 then judges in step S21 whether the use of the user palette data or the palette data of the ROM 27a has been instructed. A palette use flag is set in step S22 or S23 depending on whether the user palette data or the ROM palette data is to be used.

Figure 5A:
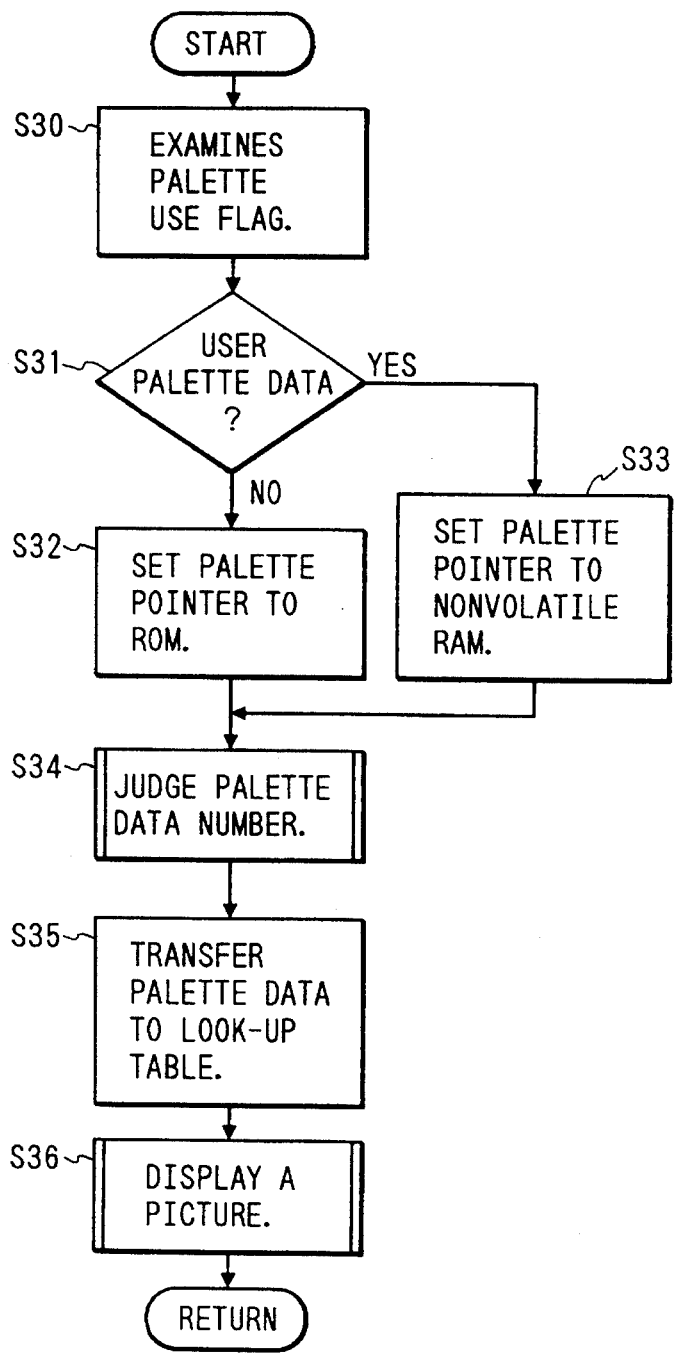
FIGS. 5(a) and 5(b) are flowcharts showing a process of displaying a picture using designated palette data.
Figure 5B:
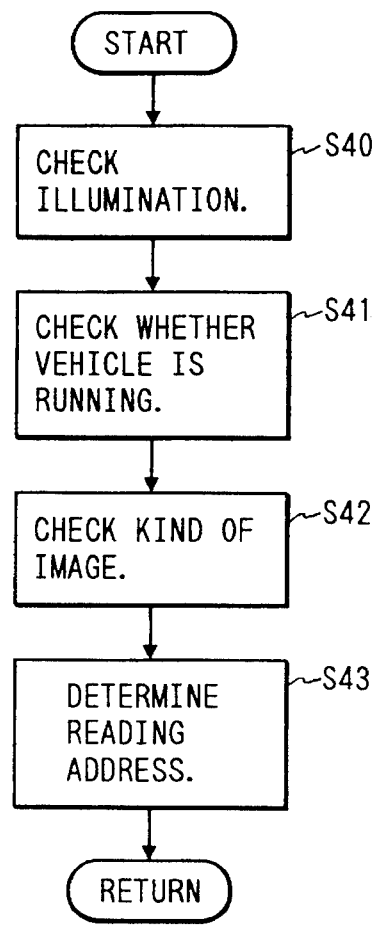

FIGS. 5(a) and 5(b) are flowcharts of a palette data setting process in displaying a map etc., which is performed by the MPU 28. FIG. 5(a) shows a main routine, and FIG. 5(b) shows a process of judging the number (i.e., management number) of the palette data to be used for displaying a picture, which corresponds to step S34 of the main routine.

As shown in the flowchart of FIG. 5(a), in the picture display process, the MPU 28 first examines the status of the palette use flag in step S30, and then judges in step S31 whether the use of the ROM palette data or the user palette data has been instructed. If the use of the ROM palette data has been instructed, in step S32 the MPU 28 sets the palette pointer at the head address of the palette data memory area of the ROM 27a. On the other hand, the use of the user palette data has been instructed, in step S33 the palette pointer is set at the head address of the palette data memory area of the nonvolatile RAM 27c. Then, the MPU 28 executes the process of FIG. 5(b) in step S34 to judge what palette data should be used to display a picture, and in step S35 reads the designated palette data and sets the readout data in the look-up table 22b. Finally, in step S36 the MPU 28 executes a process of displaying a picture.

The judgment of the palette data number is performed as shown in FIG. 5(b). In step S40, the MPU 28 first checks the state of the illumination switch through the sensor/switch interface 26 to judge whether the data for daytime or night-time should be used. Then, in step S41 the MPU 28 examines the output of the movement sensor to judge whether the vehicle is running or stopped. Finally, in step S42 the MPU 28 checks the kind of the image to be displayed to judge whether it is map information or service information. In step S43, the finally determined management number of the palette data is added to the palette pointer to obtain a palette data address for reading.

According to the above embodiment, since the RS232C interface 29 is provided as the color conversion information input means 5, the user can set the palette data he prepared in the apparatus using this input means 5. For example, the user may produce palette data by defining his desired color scheme using a lap-top personal computer. And then he may bring the lap-top personal computer into the vehicle to connect it to the navigation apparatus via the RS232C cable, and input the prepared palette data to the navigation apparatus. Therefore, where the preset color scheme does not provide such pictures that the user can readily recognize, it can be replaced by another scheme which provides pictures that are legible to the user. As a result, the apparatus of the invention can not only support a drive effectively but also contributes to safety in looking at a displayed picture.

Although in the above embodiment the number of the user palette data that can be stored in the nonvolatile RAM 27c is made eight, the invention is not limited to this. Further, the data changing method is not limited to the selection between the user palette data and the ROM palette data. For example, a large number of palette data may be input, and one of those data may be set sequentially each time a switch is depressed so that the user can select a scheme that provides the most legible picture while watching the displayed pictures.

While in the above embodiment the RS232C interface 29 is used as the color conversion information input means 5, an IC card interface may be employed to input the palette data through a memory card. This modification has an advantage that once a color scheme is determined outside a vehicle and stored in the IC card, the palette data can be input to the navigation apparatus simply by bringing the IC card into the vehicle.

As described in the foregoing, according to the navigation apparatus of the invention, the color scheme can be adjusted to one preferred by a user. Further, even if a display device is actually used whose characteristics are different than another display device used when the color scheme was determined, the color scheme can be adjusted using the display device of actual use. As a result, the invention provides improved legibility of displayed pictures and can support a drive effectively. Further, the invention contributes to safer driving.

What is claimed is:

1. A navigation apparatus which displays a map and a present position of an associated vehicle, said apparatus comprising:

a first memory for storing image data;

a second memory for storing a plurality of sets of color conversion information;

a selection unit for allowing a user to select one of a plurality of sets of color conversion information;

said sets of color conversion information including ROM palette data and user palette data;

a conversion unit for converting the image data into color data based on the user selected set of color conversion information; and a display for displaying an image based on the color data.

2. The apparatus of claim 1, wherein each of the plurality of sets of color conversion information includes a set of color conversion information for daytime and a set for night-time, and the selection unit selects the one set of color conversion information by making judgments including a judgment whether it is daytime or night-time.

3. The apparatus of claim 1, wherein each of the plurality of sets of color conversion information includes a set of color conversion information to be used when the associated vehicle is moving and a set that to be used when it is stopped, and the selection unit selects the one set of color conversion information by making judgments including a judgment whether the associated vehicle is moving or stopped.

4. The apparatus of claim 1, wherein each of the plurality of sets of color conversion information includes a set of color conversion information for map information and a set for service information.

5. The apparatus of claim 1, further comprising a receiver unit for receiving color conversion information from said user palette data, and for transferring the received information to the second memory.

6. The apparatus of claim 1, wherein the conversion unit comprises a memory for storing a color conversion table.

* * * * *